US007758790B2

(12) United States Patent
Itou et al.

(10) Patent No.: US 7,758,790 B2
(45) Date of Patent: Jul. 20, 2010

(54) METHOD AND DEVICE FOR PRODUCING CORRUGATED SHEET MATERIAL

(76) Inventors: Mitsuko Itou, 174-2, Shimomachi, Ozumachi, Kikuchi-gun, Kumamoto 869-1225 (JP); Hirobumi Itou, 174-2, Shimomachi, Ozumachi, Kikuchi-gun, Kumamoto 869-1225 (JP)

( * ) Notice: Subject to any disclaimer, the term of this patent is extended or adjusted under 35 U.S.C. 154(b) by 1179 days.

(21) Appl. No.: 11/185,933

(22) Filed: Jul. 20, 2005

(65) Prior Publication Data

US 2005/0280183 A1 Dec. 22, 2005

Related U.S. Application Data

(63) Continuation of application No. PCT/JP2004/000436, filed on Jan. 20, 2004.

(30) Foreign Application Priority Data

Jan. 21, 2003 (JP) ............................ 2003-012159

(51) Int. Cl.
*B28B 1/00* (2006.01)
*B29C 53/22* (2006.01)
*B29C 53/24* (2006.01)

(52) U.S. Cl. ...................................... 264/286; 264/263

(58) Field of Classification Search ................. 264/286, 264/293, 679; 162/109, 111–113; 156/205, 156/210
See application file for complete search history.

(56) References Cited

U.S. PATENT DOCUMENTS

| | | | | |
|---|---|---|---|---|
| 2,957,512 | A * | 10/1960 | Wade et al. | 156/163 |
| 3,596,311 | A | 8/1971 | Salmon | |
| 4,310,370 | A | 1/1982 | Arai et al. | |
| 4,407,881 | A * | 10/1983 | Shima et al. | 428/156 |
| 7,501,034 | B2 * | 3/2009 | Ashraf | 156/200 |

FOREIGN PATENT DOCUMENTS

| | | |
|---|---|---|
| DE | 199 46 252 | 4/2001 |
| JP | 53-46363 | 4/1978 |
| JP | 55-139208 | 10/1980 |
| JP | 5-263485 | 10/1993 |
| JP | 2000-263521 | 9/2000 |

OTHER PUBLICATIONS

International Preliminary Examination Report dated Dec. 20, 2004.
Supplementary European Search Report dated Oct. 31, 2008, from the corresponding European Application.

* cited by examiner

*Primary Examiner*—Steven P Griffin
*Assistant Examiner*—Cynthia Szewczyk
(74) *Attorney, Agent, or Firm*—Katten Muchin Rosenman LLP

(57) ABSTRACT

A method of stably producing a ceramic sheet with good quality, where the tip portions of convex parts constituting numerous wrinkles on the surface of the ceramic sheet are not in contact with each other, and concave parts are open. To produce the ceramic sheet, clay is placed on the upper surface of a stretched rubber sheet, and the upper surface of the clay is covered by a surface layer made from a material that burns when the clay is baked. The rubber sheet is contracted to form wrinkles on the upper surface of the clay and the surface layer. The clay is baked and the surface layer is made to disappear by burning to obtain the ceramic sheet. Thus, the surface layer prevents the tips of the convex parts constituting the wrinkles from being in direct contact with each other.

14 Claims, 6 Drawing Sheets

Drawings (A)

(B)

(A)

(B)

(C)

(D)

(E)

(A)

(B)

METHOD AND DEVICE FOR PRODUCING CORRUGATED SHEET MATERIAL

CROSS-REFERENCES TO RELATED APPLICATIONS

This application is a continuation of International Application PCT/JP2004/000436 was filed on Jan. 20, 2004, the contents of which are herein wholly incorporated by reference. Please substitute the following abstract for the one currently in the specification.

TECHNICAL FIELD

The corrugated sheet material that is the object of the manufacturing method and manufacturing device for a corrugated sheet material according to the present invention is used for example to cover a revetment of a river, or the walls and the like of various kinds of buildings. The present invention realizes a manufacturing method and a manufacturing device capable of making a good quality for this kind of corrugated sheet material.

BACKGROUND ART

An invention relating to a method of manufacturing ceramic ware having numerous wrinkles on its surface is described in Japanese Patent Application Publication No. 2000-263521. This manufacturing method is one in which clay is placed on the surface of an inflated rubber balloon, and then, by deflating the rubber balloon, numerous wrinkles are formed on the surface of the clay, and thereafter the clay is baked. Also, in the first column of the specification of Japanese Patent Application Publication No. 2000-263521, in lines 16 to 17 there is a description to the effect that it is also possible to form the wrinkles on the clay by means of a flat board shaped elastic plate.

While in Japanese Patent Application Publication No. 2000-263521 there is no disclosure regarding application of a flat board shaped sheet material in clay (ceramic sheet) having numerous wrinkles on the surface thereof, the sheet material could be considered to be used for example to cover a revetment of a river or the walls and the like of various kinds of buildings. In the case where, for example, it is used to cover a revetment of a river, by nurturing micro organisms inside the wrinkles and breaking down pollutants by these micro organisms, it becomes possible to clean up the river. Also, since a ceramic sheet having numerous wrinkles has superior sound absorption properties compared to a simple flat board shaped ceramic sheet, in the case where such a ceramic sheet is used for a wall panel to cover the wall surface of a room such as a hall, excellent acoustic properties can be achieved while maintaining a profound and dignified design for the interior walls of the room.

In Japanese Patent Application Publication No. 2000-263521 there is no disclosure of a specific apparatus for forming wrinkles in clay by means of a flat board shaped elastic plate. Moreover, for the manufacturing method, only basic elements are disclosed. Therefore it may be considered that in cases it may be difficult to efficiently obtain good quality ceramic sheets with the invention as it stands. This point is explained, with reference to FIG. 6.

In the case where the product is used to cover a revetment of a river, in order to have the river water enter into the inner part of the wrinkles so that the breakdown of pollutants can be efficiently carried out, as shown in FIG. 6(A), it is necessary that concave parts 1 of the wrinkles be of such a shape as to open surely at the surface of a ceramic sheet 2. As shown in FIG. 6(B), in the case where the tips of convex parts 3 that constitute the wrinkles contact each other, and the concave part 1 that constitutes the wrinkle is not open, water becomes unable to enter into the inner part of the concave part 1. As a result the inner part of the concave parts 1 do not contribute to the nurturing of micro organisms and the breakdown of pollutants. Also, in the case where the ceramic sheet 2 is used as a wall panel of a room, if the concave parts 1 do not open at the surface of the ceramic sheet 2 as shown in FIG. 6(B), then sound absorption by the concave parts 1 is not effectively carried out, and it becomes difficult to make the acoustic properties of the room such as a hall follow the design.

In consideration of these issues, in order to exhibit the expected performance in a corrugated sheet material such as the above mentioned ceramic sheet 2, it is desirable to realize a manufacturing method for a corrugated sheet material in which the tips of the convex parts 3 that constitute the wrinkles do not contact with each other, and the concave parts 1 open surely at the surface, and a device that is capable of implementing this manufacturing method.

DISCLOSURE OF THE INVENTION

The manufacturing method and manufacturing device for a corrugated sheet material of the present invention have been invented in consideration of these matters.

In the manufacturing method for a corrugated sheet material according to the present invention, first a raw material to be hardened in a post-process is placed in an unhardened or semi-hardened state on the top surface of a supporting film having elasticity, this supporting film being in a stretched out state, and the top surface of this raw material is covered with a surface layer made of a material that can be removed by a post-process (this is not necessarily the same as the post-process mentioned above).

After that, the supporting film is allowed to contract to thereby form wrinkles on at least the top surface of the raw material, and then the raw material is hardened, and the surface layer is removed from the raw material.

By these processes, a corrugated sheet material having numerous wrinkles on at least the top surface thereof is made.

The top surface and bottom surface mentioned in the present specification refer to the directions in a state in which the raw material is placed on the top surface of the supporting film. These up and down directions do not necessarily apply to the condition of use of the product, and for example in the case where the raw material is clay, they do not necessarily refer to the up and down direction at the time of the baking process for hardening the raw material.

Also, the manufacturing device for a corrugated sheet material according to the present invention comprises: a support plate, a plurality of guide members, a plurality of sliders, a driving device, and a supporting film.

The support plate is provided in the horizontal direction.

The respective guide members are provided in the radial direction on a top surface of the support plate.

The sliders are able to move freely along the respective guide members.

Moreover, the driving device is for moving the sliders synchronously along the respective guide members.

Furthermore, the supporting film has elasticity, and an outer peripheral edge thereof is joined to the sliders.

In the case of the manufacturing method for a corrugated sheet material constructed as described above, by allowing the stretched out supporting film to contract, a force in the direction of contraction is applied to the bottom surface of the raw material placed on the top surface of the supporting film. As a result, a force in the compression direction is applied across the surface direction of the raw material. Because the bottom surface of the raw material in this state is adhered to the top surface of the supporting film (either directly or via an intermediate layer), wrinkles form on at least the top surface of the raw material and the surface layer covering the top surface of the raw material, due to the force in the compression direction. In this case, because the top surface of the raw material is covered by the surface layer, the raw material does not contact directly with itself at the tips of the numerous convex parts that constitute the wrinkles. That is to say, even in the case where the tips of the convex parts contact each other, the surface layer exists at the contacting part. Therefore, if the raw material is hardened and the surface layer is removed from the raw material, there is definitely a gap between the tips of the convex parts in a state where the raw material is hardened and the corrugated sheet material is completed. In other words, the numerous concave parts that constitute the wrinkles are in a condition where they have a definite opening to the surface part of the corrugated sheet material.

Moreover, in the case of the manufacturing device for a corrugated sheet material according to the present invention, the supporting film can be stretched in a horizontal state by moving the plurality of sliders synchronously in radial directions along the respective guide members by the driving device. Consequently if after placing unhardened or semi-hardened raw material on the top surface of the supporting film in a condition in which the supporting film is stretched out by moving the respective sliders radially outwards, the respective sliders are moved radially inwards allowing the supporting film to contract, wrinkles can be formed on the top surface of the raw material.

BEST MODE FOR CARRYING OUT THE INVENTION

Figure 1:
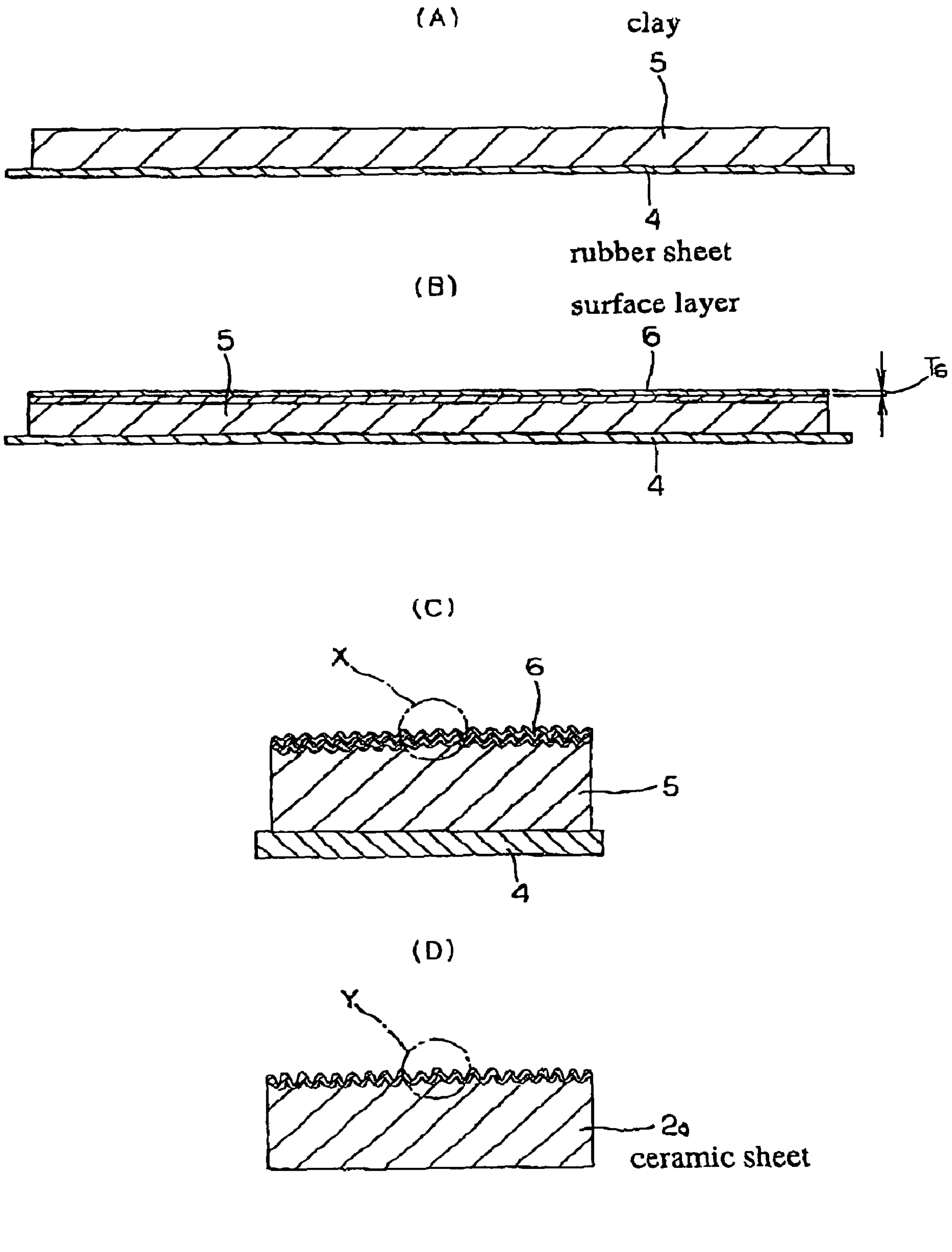
FIGS. 1(A) to (D) are schematic sectional views showing sequential steps in a first example of an embodiment of the manufacturing method of the present invention.
Figure 2:
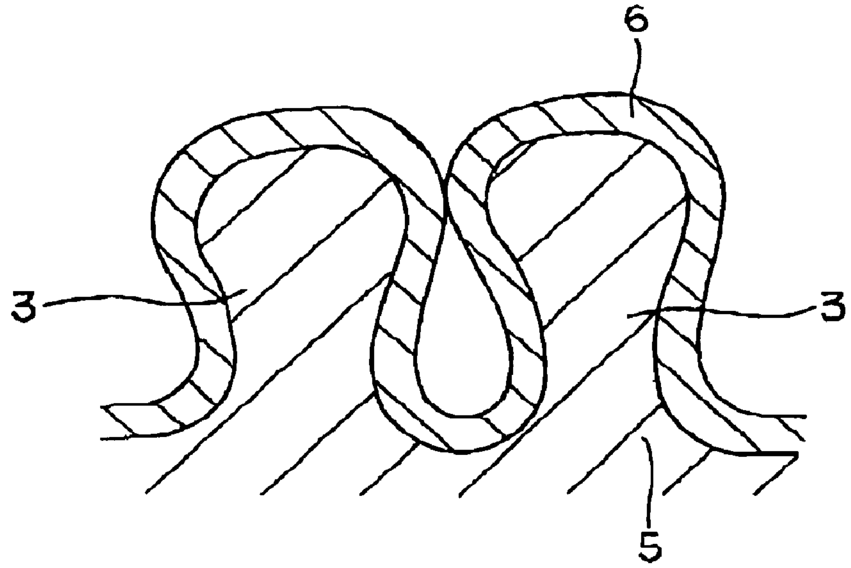
FIGS. 2(A) and (B) are respective enlarged cross sectional drawings of the X part in FIG. 1(C) and the Y part in FIG. 1(D).
Figure 2:
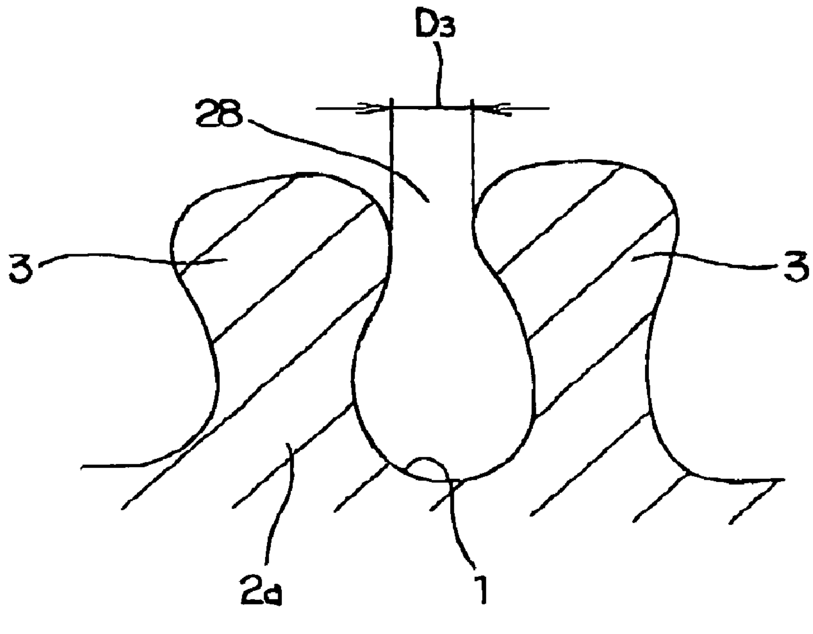

FIG. 1 and FIG. 2 show a first example of an embodiment of the present invention. In this example, a first example is shown of a manufacturing method for baking clay to make a ceramic sheet having numerous wrinkles on the surface, being suitable for covering a revetment in a river, or the walls of a room such as a hall. In the case of this example, first as shown in FIG. 1(A), clay 5 which is a raw material that will be hardened by a post-process (baking), is placed on the top surface of a rubber sheet 4 serving as a supporting film having elasticity. In this case, the rubber sheet 4 is stretched out. Whether the direction of stretching of the rubber sheet 4 is to be in a one dimensional direction (rectilinear direction) or a two dimensional direction (surface direction) is appropriately decided according to what kind of wrinkles are to be formed on the surface of the product. If the rubber sheet 4 is stretched in the one dimensional direction then wrinkles that arc close in shape to corrugations can be formed on the surface of the product. On the other hand, if the rubber sheet is stretched in the two dimensional direction, then numerous convex parts that are swollen into respective purse shapes are formed on the surface of the product, and complex wrinkles can be formed. Also, even in the case in which the stretching is in the two dimensional direction, the amount of stretching in a predetermined direction and the amount of stretching in a direction orthogonal to this predetermined direction need not be made equal. If the amounts of stretching in both these directions are allowed to differ, then corresponding to this difference, the shapes of the wrinkles formed on the surface of the product that can be obtained differ. In short, the rubber sheet 4 is stretched in at least one direction corresponding to the shape of the wrinkles to be obtained.

The clay 5 is placed on the rubber sheet 4 of the kind described above, and the thickness and distribution of the clay 5 are made appropriate in accordance with the shape of the product to be obtained. In this case, the thickness is made thinner than that of the object to be obtained, and the distribution, while arbitrary, is generally uniform. In this condition the bottom surface of the clay 5 and the top surface of the rubber sheet 4 are adhered. Next, as shown in FIG. 1(B), the top surface of the clay 5 is covered with a surface layer 6 of a material that can be removed by a post-process. As a material for the surface layer 6, a material that can burn up when the clay 5 is being baked, specifically carbon powder diffused into a starch glue to form a hard paste, or oblate, or agar or the like, may be used. Also, the thickness $T_6$ of the surface layer 6 (refer to FIG. 1(B)) is regulated appropriately according to an interval $D_3$ (refer to FIG. 2(B)) between the tips of the convex parts 3 to be formed on the top surface of the product to be obtained. Specifically, when the interval $D_3$ is to be made larger, then the thickness $T_6$ is made thicker. When the wrinkles are made on the top surface of the clay 5, the surface layer 6 is slightly crushed between the adjacent tips of the convex parts 3. Consequently, the thickness $T_6$ should be made slightly greater than ½ of the interval $D_3$ ($T_6>D_3/2$). The extent to which the thickness $T_6$ should be thus increased can be found experimentally.

As mentioned above, once the clay 5 has been adhered to the top surface of the stretched rubber sheet 4, and the top surface of the clay 5 has been covered by the surface layer 6, the rubber sheet 4 is subsequently allowed to contract. Since the top surface of the rubber sheet 4 and the bottom surface of the clay 5 are adhered due to cohesion of the clay 5, then by allowing the rubber sheet 4 to contract, a force in the contraction direction is applied to the bottom surface of the clay 5 placed on the top surface of the rubber sheet 4. As a result, a force in the compression direction is applied across the surface direction to the clay 5. Even in this state, the bottom surface of the clay 5 is adhered to the top surface of the rubber sheet 4. Therefore, the planar shape of the clay 5 becomes smaller with the contraction of the rubber sheet 4, and deforms plastically in a direction in which its thickness increases. At the time of this plastic deformation, a buckling stress is applied to the top surface of the clay 5, which, unlike the bottom surface supported by the rubber sheet 4, is unsupported, and to the surface layer 6. Then, as shown in FIG. 1(C)

due to this stress, wrinkles form on the top surface of the clay 5 and on the surface layer 6 that covers the top surface of the clay 5.

In this case, because the top surface of the clay 5 is covered by the surface layer 6, the clay does not contact directly with itself at the tips of the numerous convex parts 3 that constitute the wrinkles. In other words, even in the case in which the respective tip parts of the convex parts 3 contact with each other, as is shown in detail in FIG. 2(A), the surface layer 6 exists in the part where they contact with each other. Then the clay 5 and the surface layer 6 are taken off in one piece from the top surface of the rubber sheet 4 (for example by inserting a thin board between the bottom surface of the clay 5 and the top surface of the rubber sheet 4), and transferred onto the upper surface of a separate receiver board having sufficient thermal resistance (although not shown in the diagram, generally a flat plate of carborundum or iron. The plate may also be of wood providing that a transfer operation is carried out prior to baking). Then, the clay 5 and the surface layer 6 (after sufficient drying as necessary) are put into a kiln together with the backing plate and heated, and the clay is baked. The heating temperature is generally similar to the temperature when baking clay roof tiles or ceramic ware, and may be set arbitrarily according to the type of clay 5, for example around 1000 degree C. The heating temperature is decided appropriately according to the materials used and the strength deemed to be necessary and so forth. For example, when baking clay it is possible to use temperatures of 600 degree C. and above, and when baking fine ceramics, temperatures of 2000 degree C. may be used.

By making it in this way, when the clay 5 is baked the surface layer 6 is burned up. Then, in a condition where the clay 5 is hardened, and the ceramic sheet 2*a*, which is the corrugated sheet material as shown in FIG. 1(D), is completed, there exists a definite gap 28 between the tips of the convex parts 3 as shown in FIG. 2(B). In other words, the numerous concave parts 1 that constitute the wrinkles are of a condition in which they have a definite opening to the surface part of the corrugated sheet material.

If a ceramic sheet 2*a* of this kind is used for example to cover a revetment of a river, the water of the river enters into the inner part of the numerous concave parts 1 constituting the wrinkles. Then, as a result of the inner parts of the respective concave parts 1 contributing to the nurturing of micro organisms and the break down of pollutants, the break down of pollutants can be efficiently performed. Also, in the case where the ceramic sheet 2*a* is used as a wall panel in a room, by allowing sound waves to enter into the inner parts of the concave parts 1, the absorption of sound waves can be efficiently carried out by the concave parts 1, and it becomes easy to make the acoustic characteristics of a room such as a hall conform with a design.

Figure 3:
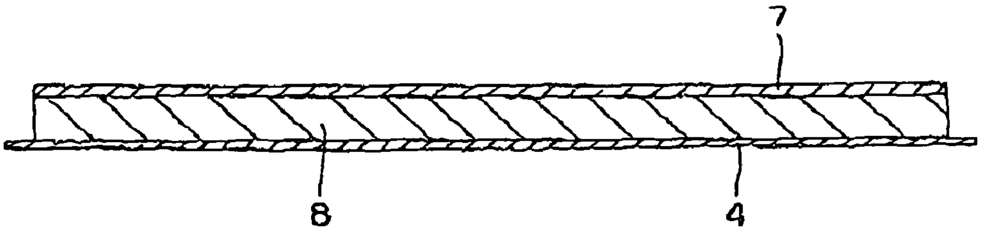
FIGS. 3(A) to (E) are schematic sectional views showing sequential steps in a second example of an embodiment of the manufacturing method of the present invention.
Figure 3:
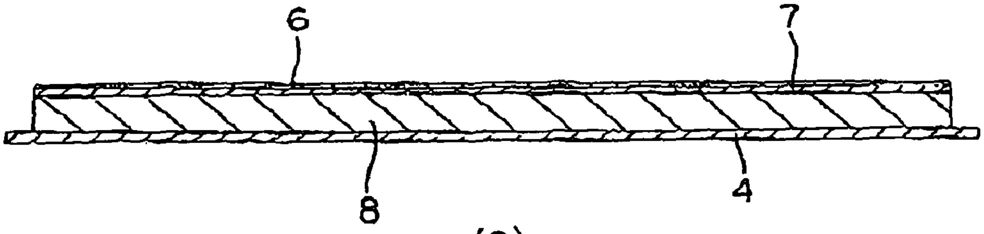
Figure 3:
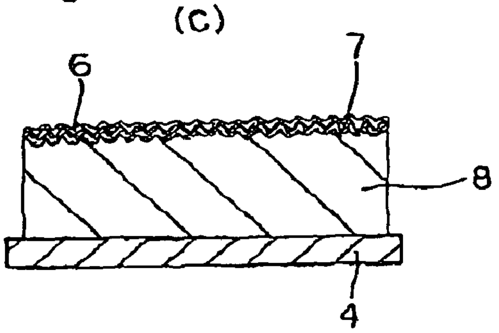
Figure 3:
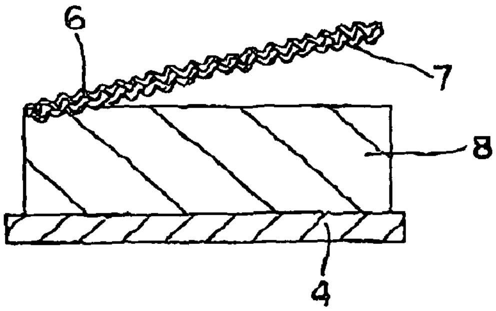
Figure 3:
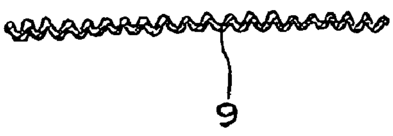

Next, FIG. 3 shows a second example of an embodiment of the present invention. This example relates to a manufacturing method for a corrugated sheet material made from synthetic resin, that can be used in the case where acoustic characteristics are to be improved while taking design into consideration, as with for example, the drawing room of a normal dwelling, or an audio room.

In the case of this example, first of all, as shown in FIG. 3(A), an intermediate layer 8 is interposed between the top surface of a rubber sheet 4 serving as a supporting film having elasticity, and the bottom surface of a synthetic resin 7 which is the raw material. Photocurable resin, thermoplastic resin and so forth having water-shedding quality, and for which the viscosity become higher during the hardening process, are used for the synthetic resin 7. Also, the intermediate layer 8 is made from a material that undergoes plastic deformation due to force in a compression direction, and is shrinkable, and can be removed by a post-process. Specifically, various kinds of water soluble paste such as starch paste, or various kinds of water soluble gel material such as heated congealed agar can be used as the material for this kind of intermediate layer 8. Also, as shown in FIG. 3(B), the top surface of the synthetic resin 7 is covered with a surface layer 6 that is made from the same kind of material as the intermediate layer 8.

As mentioned above, once the intermediate layer 8, the synthetic resin 7, and the surface layer 6 have been laminated on the top surface of the rubber sheet 4 with the rubber sheet 4 in a stretched out condition, the rubber sheet 4 is allowed to contract before the synthetic resin 7 hardens (in a semi hardened state). As a result, as shown in FIG. 3(C), the intermediate layer 8 contracts forming wrinkles on the top surface, and the synthetic resin 7 provided on the top surface of the intermediate layer 8 contracts forming wrinkles on the top and bottom surfaces thereof. In this way, the tip parts of the convex parts that construct the wrinkles that are formed on the top and bottom surfaces of the synthetic resin 7 do not contact directly with each other, in the same way as the case of the first example mentioned above. Then the synthetic resin 7 with wrinkled top and bottom surfaces is allowed to harden while sandwiched between the intermediate layer 8 and the surface layer 6.

Accordingly, once the synthetic resin 7 is hardened with the numerous wrinkles formed on the top and bottom surfaces thereof, then as shown in FIGS. 3(D) and (E), the intermediate layer 8 and the surface layer 6 are removed. This removal operation is carried out either by blasting water at the top and bottom surfaces of the synthetic resin sheet 7, or by immersing this synthetic resin sheet in hot water (in the case where the intermediate layer 8 and the surface layer 6 are agar). Accordingly, once the intermediate layer 8 and the surface layer 6 have been removed from the top and bottom surfaces of the synthetic resin 7, a synthetic resin sheet material 9 of the kind shown in FIG. 3(E), having numerous wrinkles formed on both sides, is obtained. By using such a sheet material for example to cover the inner wall surface of the drawing room of an ordinary dwelling, or of an audio room, the acoustic properties of the room can be improved while taking into consideration the design of the inner surfaces thereof.

A synthetic resin sheet material simply having numerous wrinkles on the surface can also be manufactured by injection molding. However, in that case, it is necessary that the cross sectional shape of the concave parts forming the numerous wrinkles is such that the width (diameter) of the opening part is greater than the width (diameter) of the inner part. In other words, a synthetic resin sheet material having numerous wrinkles with the cross section shape of the concave parts in a purse shape, as in the present example, cannot be made by injection molding. According to the manufacturing method for a corrugated sheet material of the present example, a form is obtained that cannot be obtained using injection molding, which is the normal method for manufacturing synthetic resin products.

Figure 4:
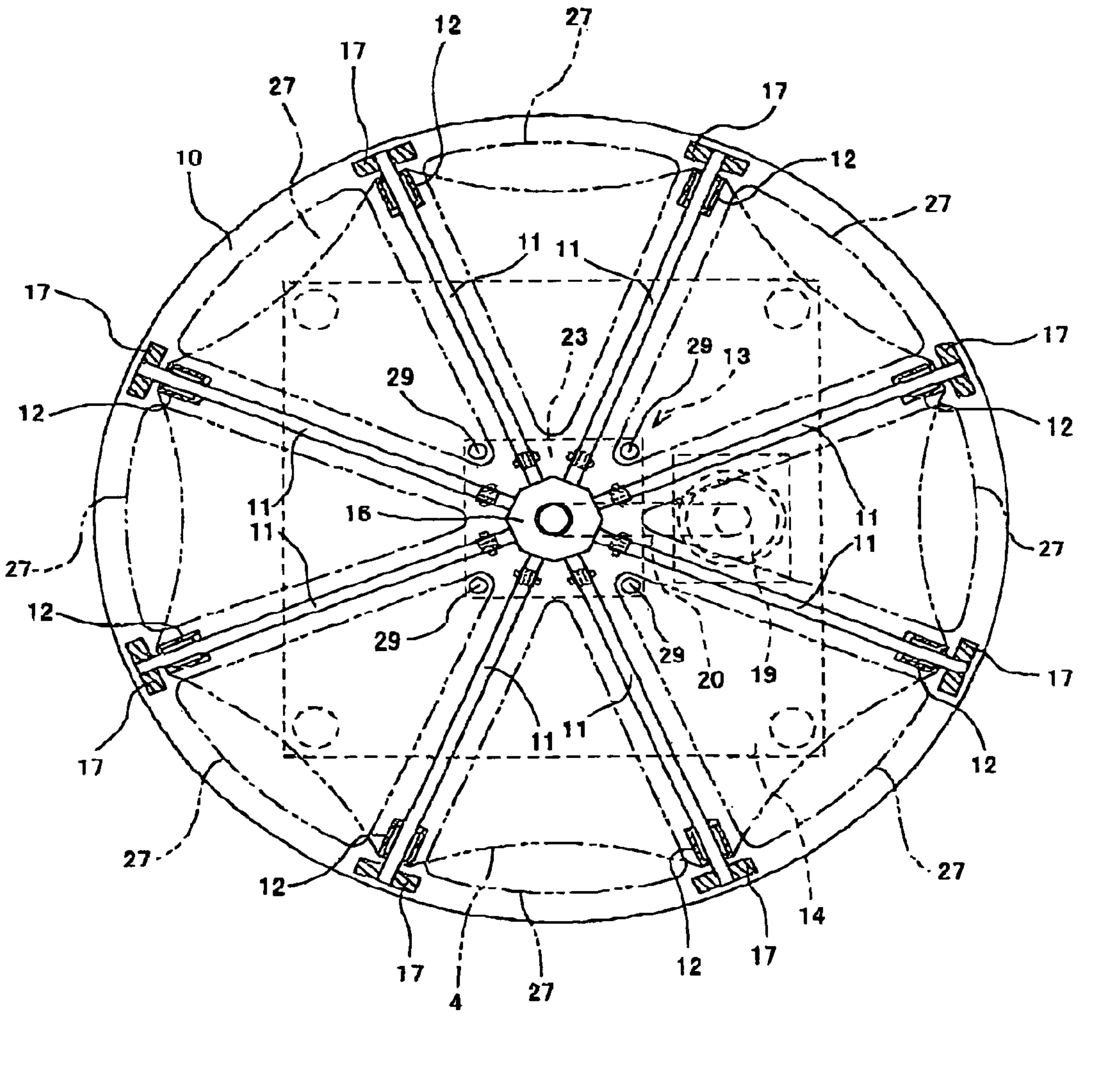
FIG. 4 is a plan view showing a first example of an embodiment of the manufacturing device of the present invention.
Figure 5:
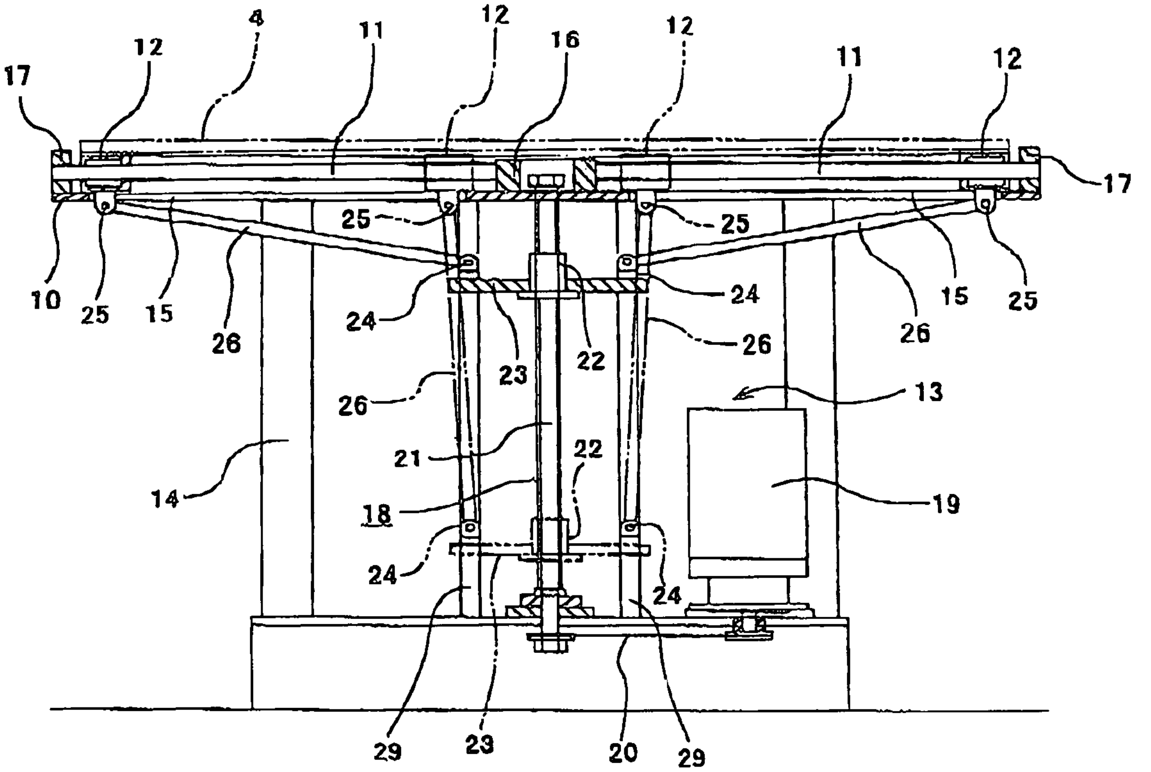
FIG. 5 is a longitudinal section view showing the first example of the embodiment of the manufacturing device of the present invention.
Figure 6:
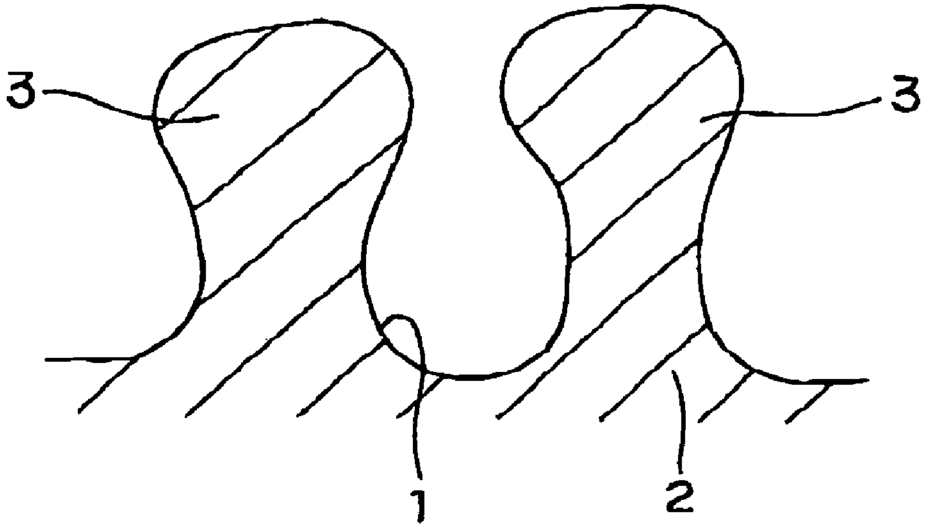
FIG. 6 is a diagram similar to FIG. 2(B) for describing problem areas of a conventional corrugated sheet material.
Figure 6:
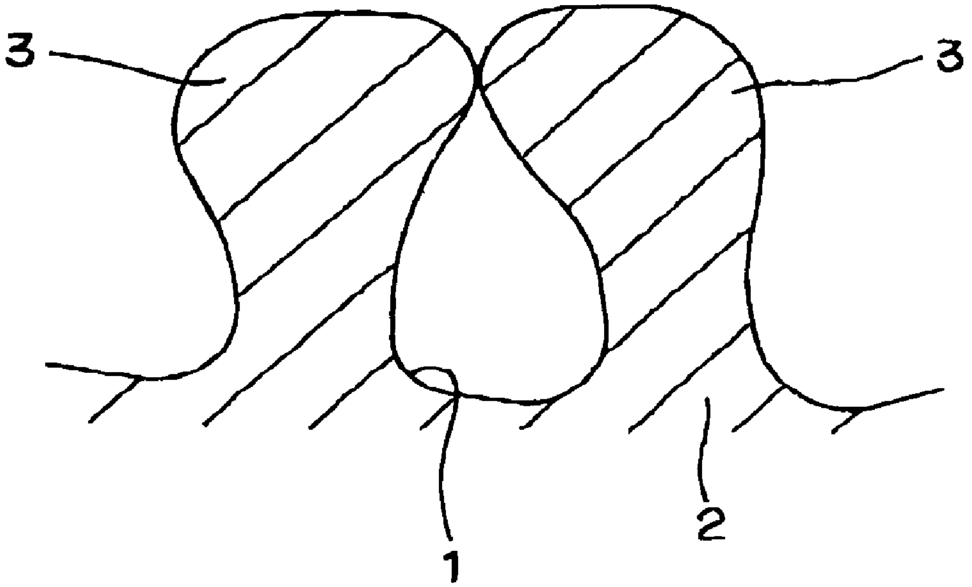

Next FIG. 4 and FIG. 5 show one example of an embodiment of a manufacturing device for corrugated sheet material according to the present invention. This manufacturing device is provided with; a support plate 10, a plurality of guide rods 11 serving as guide members, a plurality of sliders 12, a driving device 13, and a rubber sheet 4 serving as a supporting film.

The support plate 10 is a round plate shape provided horizontally in a fixed state on the upper end of a frame 14. Slits 15 are respectively provided in radial directions in a plurality of places (eight places in the example shown in the diagram) around the circumferential direction of the support plate 10. The outside end parts of the slits 15 in relation to the diameter direction of the support plate 10 do not reach the peripheral edge of the support plate 10, while the inside end parts do not reach the center part of the support plate 10.

Also the guide rods 11 are provided on the top surface of the support plate 10, along the respective slits 15 (directly above the respective slits 15). For this reason, a central support block 16 is provided in the center part of the top surface of the support plate 10, and in the same way outside support blocks 17 are provided in a plurality of places on the top surface outer diameter side end part. The respective guide rods 11 are disposed in the horizontal direction on the top surface of the support plate 10 in a state in which both the respective ends are joined to and supported by the central support block 16 and the outside support blocks 17.

Also, the sliders 12 are externally fitted to, and supported by, the respective guide rods 11 so as to allow free movement along the guide rods 11. Moreover, the sliders 12 are made to move synchronously along the respective guide rods 11 by the drive device 13.

In the case of the present example, the drive device 13 is constructed incorporating a feed screw mechanism 18. This feed screw mechanism 18 is disposed in the vertical direction below the center part of the support plate 10, and is constructed with a threaded rod 21 rotated via a chain by a motor 19, which is able to turn both clockwise and counter clockwise, and a nut piece 22 that are screwed together. Moreover, the opposite ends of second push rods 26 are pivoted on rising and descending side lock parts 24 provided in a plurality of places on the top surface of a rising and descending plate 23, which is fixed to the nut piece 22 and which is free only to rise and descend guided by second guide rods 29, and on horizontal movement side lock parts 25 provided on the bottom surfaces of the respective sliders 12.

In the drive device 13 constructed in this way, as shown by the chain lines in FIG. 5, in a state where the rising and descending plate 23 is lowered, the push rods 26 pull the respective slides 12 towards the center of the support plate 10. Conversely, as shown by the full lines in FIG. 5, in a state in which the rising and descending plate 23 is raised, the push rods 26 push the respective sliders 12 towards the outer diameter portion of the support plate 10.

A plurality of places on the circumferential edge of the rubber sheet 4 are joined to the respective sliders 12 For this purpose, for example the plurality of places on the circumferential edge of the rubber sheet 4 may be held between the top surfaces of the respective sliders 12 and the bottom surfaces of presser plates, and the respective presser plates then screwed to the sliders to fasten them. Above the support plate 10 are provided sector shaped auxiliary support plates 27 adjacent to each other around the circumferential direction, in positions between the slits 15 and the guide rods 11. These auxiliary support plates 27 are in contact with, or closely opposed to, the bottom surface of the rubber sheet 4, and prevent the rubber sheet 4 from drooping downwards under its own weight or that of the clay 5 and such like (see FIG. 1 and FIG. 2).

According to the manufacturing device for a corrugated sheet material of this example, in the case of making for example the ceramic sheet 2*a* shown in FIG. 1(D), the rising and descending plate 23 that constitutes the drive device 13 is raised. Then, the sliders 12 are pushed by the respective push rods 26 and the sliders 12 are moved in the radial outward direction of the support plate 10, synchronously along the respective guide rods 11. As a result, the plurality of places around the circumferential direction on the circumferential edge of the rubber sheet 4 are pulled radially outwards, and the rubber sheet 4 is stretched in the surface direction.

Then, with the rubber sheet 4 in the stretched state in this way, an unhardened raw material such as clay 5 (refer to FIG. 1) is placed on the top surface of the rubber sheet 4, after which the rising and descending plate 23 is lowered. Then, the sliders 12 are pulled by the respective push rods 26, and the sliders 12 are moved synchronously along the respective guide rods 11 towards the central part of the support plate 10. As a result, the rubber sheet 4 contracts in the surface direction, and hence wrinkles can be formed on the top surface of the raw material such as the clay 5.

The corrugated sheet material that is the object of the present invention, in addition to being used to cover a revetment of a river or the wall surface of various types of buildings as mentioned above, by making use of its large surface area, it can be used as an anchor plate for coral larvae (planula) or seaweed spores, as a photocatalytic carrier, a catalyst or catalyst carrier, as an adsorbant, a deodorant, an odor eliminator, or as a sustained-release element (a carrier that retains any kind of substance and releases it gradually), a carrier for luminous agents, a sensor, a radiator, a heating element, a heat exchanging element, a condenser, an electrode for a fuel cell and so forth. Furthermore, artificial bone and electromagnetic wave absorbing bodies are also possibilities. Also, by coating the surface with a thin film of metal, a sheet material that irregularly reflects and diffuses light it can be constructed. Also, by making it from transparent or translucent synthetic resin, a light diffusion plate is also possible. In addition, by making use of the elastic deformation afforded by the plurality of convex and concave parts on the surface, by clamping it between the joining faces of a pair of physical bodies that are rigid bodies (with a high Young's modulus), it reduces the stress acting between these joined surfaces due to changes in temperature and so forth, and can be used to realize a construction that prevents the occurrence of warping and peeling off and such like.

For the material for constituting the corrugated sheet material, depending on the usage, mortar (concrete), fine ceramic, glass powder, metal powder, wood powder (sawdust), rubber, or biomaterial and so forth may be appropriately used. Regarding fine ceramic, glass powder, metal powder and wood powder, with an appropriate binder (adhesive) mixed with them to produce a gel state (paste state) substance, wrinkles are formed on the surface and then it is hardened. The step for hardening is selected from sintering, baking, drying, curing and so forth, according to the type of raw material and binder. The metal powder may be sintered together with an appropriate binder and made into a sintered metal. Also, by mixing the wood powder with an appropriate synthetic resin, forming the wrinkles and hardening it, it may be used as a wall panel having superior sound absorption properties. Moreover for the rubber, by using conductive rubber incorporating powdered conductive material such as carbon, a mounting board having superior electromagnetic wave absorption properties can be obtained. In addition, with respect to the above mentioned biomaterial, making use of the large surface area it may contribute to the realization of artificial organs such as artificial kidneys and artificial lungs.

INDUSTRIAL APPLICABILITY

The manufacturing method and manufacturing device for a corrugated sheet material of the present invention, can be constructed and used as described above. Therefore a high quality corrugated sheet material capable of demonstrating excellent properties in the case of use in various kinds of applications can be stably and consistently produced.

The invention claimed is:

1. A manufacturing method for a corrugated sheet material, the method comprising:

(a) placing a first material on a top surface of a stretched-out elastic supporting film; the first material comprising a raw material hardenable into the corrugated sheet material (b) covering a top surface of the first material with a surface layer comprising a second material, the second material comprising a deformable material;

(c) contracting the supporting film to wrinkle the top surface of the first material and the surface layer; and (d) then hardening the first material into the corrugated sheet material, and (e) removing the second material from the first material to expose the corrugated sheet material having numerous wrinkles on at least a top surface the corrugated sheet material.

2. A manufacturing method for a corrugated sheet material according to claim 1, wherein the first material is clay, and the second material is a substance that can be removed by burning at a temperature for baking the clay.

3. The method of claim 2, wherein the second material comprises a paste, an oblate, or an agar in which carbon powder is diffused into a starch glue.

4. The method of claim 1, wherein the wrinkles comprise a plurality of concave parts and a plurality of convex parts, wherein an interval; distance between tips of adjacent convex parts is smaller than a width of an inner portion of a concave part disposed between the adjacent convex parts.

5. The method of claim 4, wherein the surface layer comprises a thickness having a dimension of substantially of one-half of the interval distance.

6. The method of claim 1, wherein step (c) is performed by contracting the support film in a direction in which a planar shape of the first material becomes smaller and a thickness increases.

7. The method of claim 1, wherein the supporting film comprises a rubber sheet.

8. A manufacturing method for a corrugated sheet material, the method comprising:

(a) placing a first material onto a top surface of a second material disposed on a stretched-out elastic supporting film, the first material comprising a raw material hardenable into the corrugated sheet material, the second material being an intermediate layer comprising a deformable and shrinkable material that is interposed between a top surface of the supporting film and a bottom surface of the raw material;

(b) covering a top surface of the first material with a surface layer comprising a third material, the third material comprising a deformable material;

(c) contracting the supporting film to wrinkle the top and the bottom surface of the first material and the surface layer;

(d) hardening the first material into the corrugated sheet material; and (e) removing the second and third material from the first material to expose the corrugated sheet material having numerous wrinkles on both the top and bottom surfaces thereof.

9. A manufacturing method for a corrugated sheet material according to claim 8, wherein the first material comprises a synthetic resin, and the second and third material comprises a material that can be removed by washing with a liquid which does not affect the synthetic resin, and wherein step (c) is performed when the synthetic resin is in a semi hardened state and step (e) is performed by washing away the second and third materials with the liquid.

10. The method of claim 9, wherein the second and third material comprise a water soluble paste or a water soluble gel material.

11. The method of claim 8, wherein the wrinkles comprise a plurality of concave parts and a plurality of convex parts, wherein an interval; distance between tips of adjacent convex parts is smaller than a width of an inner portion of a concave part disposed between the adjacent convex parts.

12. The method of claim 11, wherein the surface layer comprises a thickness having a dimension of substantially of one-half of the interval distance.

13. The method of claim 8, wherein step (c) is performed by contracting the support film in a direction in which a planar shape of the first material becomes smaller and a thickness increases.

14. The method of claim 8, wherein the supporting film comprises a rubber sheet.

* * * * *